(12) United States Patent  (10) Patent No.: US 6,929,688 B2
Baettig et al.  (45) Date of Patent: Aug. 16, 2005

(54) MONOAZO DYES AND THEIR PREPARATION AND USE

(75) Inventors: Kurt Baettig, Praroman-le Mouret (CH); Thomas Stauner, Marly (CH)

(73) Assignee: Ilford Imaging Switzerland GmbH (CH)

( * ) Notice: Subject to any disclaimer, the term of this patent is extended or adjusted under 35 U.S.C. 154(b) by 130 days.

(21) Appl. No.: 10/444,532

(22) Filed: May 23, 2003

(65) Prior Publication Data

US 2003/0221588 A1 Dec. 4, 2003

(30) Foreign Application Priority Data

May 27, 2002 (EP) .............................. 02405422

(51) Int. Cl.⁷ .................. C09D 11/02; C09B 29/09; B05D 1/26
(52) U.S. Cl. ................. 106/31.51; 106/31.48; 8/682; 8/437; 534/803; 534/841; 534/798; 427/466
(58) Field of Search .............. 106/31.51, 31.48; 8/682, 437; 534/803, 841, 798; 427/466

(56) References Cited

U.S. PATENT DOCUMENTS

| | | | |
|---|---|---|---|
| 4,626,284 A | 12/1986 | Ohta et al. | |
| 4,703,113 A | 10/1987 | Baxter et al. | |
| 4,963,189 A | 10/1990 | Hindagolla | |
| 5,074,914 A | 12/1991 | Shirota et al. | |
| 5,102,459 A * | 4/1992 | Ritter et al. | 106/31.36 |
| 5,135,571 A * | 8/1992 | Shirota et al. | 106/31.51 |
| 5,254,160 A * | 10/1993 | Beach et al. | 106/31.51 |
| 5,542,970 A | 8/1996 | Miura et al. | |
| 5,777,089 A * | 7/1998 | Beckmann et al. | 534/765 |
| 5,779,781 A * | 7/1998 | Gregory et al. | 106/31.51 |
| 6,183,549 B1 * | 2/2001 | Wight | 106/31.51 |
| 6,277,185 B1 * | 8/2001 | Watson et al. | 106/31.48 |
| 6,669,740 B2 * | 12/2003 | Siemensmeyer et al. | 8/471 |
| 6,709,502 B2 * | 3/2004 | Baettig | 106/31.51 |
| 2002/0017218 A1 * | 2/2002 | Baetig et al. | 106/31.51 |
| 2002/0121221 A1 * | 9/2002 | Baettig | 106/31.51 |
| 2004/0074018 A1 * | 4/2004 | Wuzik et al. | 8/543 |

FOREIGN PATENT DOCUMENTS

| | | |
|---|---|---|
| EP | 0425150 A2 | 5/1991 |
| EP | 0597672 A2 | 5/1994 |
| EP | 0602816 A1 | 6/1994 |
| EP | 0918074 A1 | 5/1999 |
| EP | 1006157 A1 | 6/2000 |
| GB | 2289473 A | 11/1995 |
| JP | 03-203970 | 9/1991 |
| WO | WO 96/24636 | 8/1996 |

* cited by examiner

*Primary Examiner*—Helene Klemanski
(74) *Attorney, Agent, or Firm*—Dara L. Onofrio, Esq.; Onofrio Law

(57) ABSTRACT

Monoazo dyes of general formula (IV)

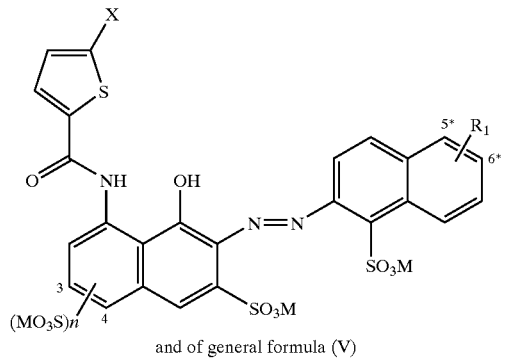

and of general formula (V)

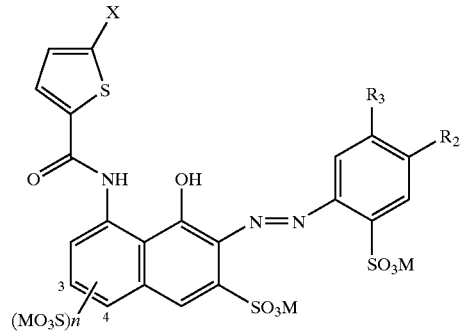

wherein $R_1$, $R_2$, $R_3$, X, M and n are as described in the specification, are excellent dyes for dyeing and printing of cellulose containing materials and textile materials and especially for the preparation of inks for ink jet printing.

13 Claims, No Drawings

MONOAZO DYES AND THEIR PREPARATION AND USE

FIELD OF THE INVENTION

The invention relates to novel monoazo dyes and their salts, a method of their preparation and their use in dying and printing operations. It relates also to liquid dye preparations containing these dyes, particularly to aqueous inks for ink jet printing.

BACKGROUND OF THE INVENTION

Ink jet printing processes are essentially of two types:

In continuous stream ink jet printing systems, ink is emitted in a continuous stream under pressure through a nozzle. The stream breaks up into individual droplets at a certain distance from the nozzle. If a specific location on the recording sheet has to be printed the individual droplets are directed to the recording sheet, otherwise they are directed to a collecting vessel. This is done for example by charging unnecessary droplets in accordance with digital data signals and passing them through an electrostatic field which adjusts the trajectory of these droplets in order to direct them to the collecting vessel. The inverse procedure may also be used wherein uncharged droplets end up in the collecting vessel.

In the non-continuous process, or the so-called "drop-on-demand" systems, droplets are generated in accordance with digital data signals only if a specific location on the recording sheet has to be printed.

The speed of ink jet printers of the newest generation is ever increasing for economic reasons. Digital images, captured with digital cameras or generated by scanning of silver halide camera films, may be printed with these modern printers at a quality level that makes these images nearly indistinguishable from classical copies on silver halide materials. Images produced in this way need to have an excellent storage stability even under adverse conditions. This can only be achieved by using a finely tuned system of inks (respectively the dyes contained therein) together with a suitable recording sheet.

Recording sheets particularly suitable for these printers and photo realistic recordings need to absorb the inks very rapidly. The recording sheets comprise organic polymers and/or microporous inorganic oxides. Up to now the produced images do not have all the properties required. Particularly the brilliance of images printed onto such recording sheets is unsatisfactory. Therefore, there is a need for dyes in order to increase especially the brilliance of red and magenta colors of images printed onto these recording sheets.

Although quite a number of different dyes have already been proposed as dyes for ink jet printing, none meets all the necessary requirements.

The magenta dye of formula (I) (Example No. 2) is described in U.S. Pat. No. 5,542,970 to Miura et al.

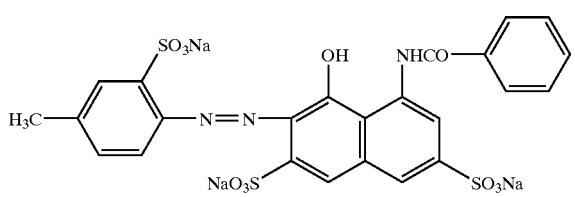

(I)

The magenta dye of formula (II) (Example No. 1) is described in patent application EP 0,918,074.

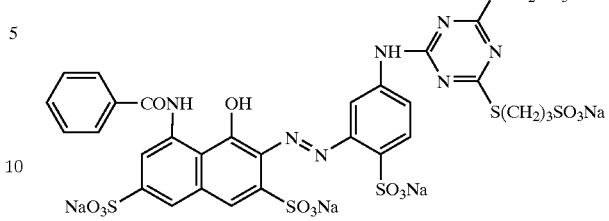

(II)

The magenta dye of formula (III) (Example No. 1) is described in patent application JP 03-203,970.

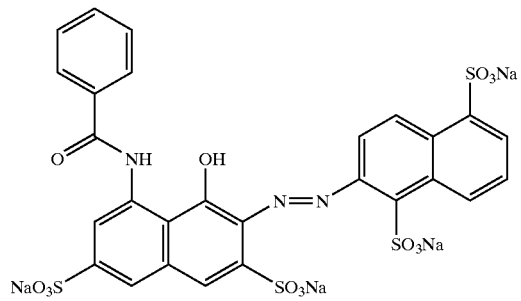

(III)

All these dyes, representing the state of the art, do not satisfy all the required demands if they are used in the formulation of inks for ink jet printing that should provide magenta images or colorings with particularly brilliant bluish hues on any type of recording sheet as plain or coated paper, coated or uncoated, opaque or transparent synthetic materials (elevated negative values of b* in the L*a*b* system).

Dyes used for such inks need to have a good solubility in the essentially aqueous ink liquid, they have to penetrate into the recording sheet and should not show dye aggregation on the surface of the recording sheet ("bronzing"). They need to provide printed images having high optical density, good water fastness, good light stability and good storage stability even under adverse conditions. They need to be stable in the ink even when the ink is stored for a long time under adverse conditions.

Various types of compositions have been proposed as inks. Typical inks comprise one or more dyes or pigments, water, organic cosolvents and other additives.

The inks have to meet the following criteria:

(1) The ink gives images of excellent quality on any type of recording sheet.
(2) The ink gives printed images exhibiting good water fastness.
(3) The ink gives printed images exhibiting good light stability.
(4) The ink gives printed images exhibiting excellent smudge behavior.

(5) The ink gives printed images exhibiting excellent storage stability under conditions of high temperature and humidity.
(6) The ink does not clog jetting nozzles of the ink jet printers even when these are kept uncapped while recording is suspended for long periods.
(7) The ink may be stored for long periods of time without deterioration of its quality.
(8) The values of the physical properties of the inks, such as viscosity, conductivity and surface tension are all within defined ranges well suited for the intended use.
(9) The ink has to be non-toxic, not flammable and safe.

SUMMARY OF THE INVENTION

Accordingly, an object of the invention is to provide novel, brilliant monoazo dyes having incorporated in their structure a thiophene substituent with a red, in particular a magenta hue and showing, at the same time, excellent light stability, diffusion fastness and high solubility. They provide images or colorings showing good overall properties, in particular in the ink jet printing process, where they provide images with maximum color rendition, and where the sharpness of the images does not or only slightly deteriorate during long periods of storage under conditions of high temperature and humidity.

A further object of the invention is the provision of liquid dye preparations, in particular of inks for ink jet printing, showing a spectrally unchanged hue on any type of recording sheet such as plain or coated paper, coated or uncoated, opaque or transparent synthetic materials.

A further object of the invention is the provision of inks satisfying all the requirements mentioned above.

In the present invention, these purposes, as well as others which will be apparent, are achieved generally by providing novel monoazo dyes of general formulas (IV) and (V) detailed below.

Other objects, features, and advantages of the present invention will become apparent from the following detailed description of the invention.

DETAILED DESCRIPTION OF THE INVENTION

The present invention relates to novel monoazo dyes of general formula (IV)

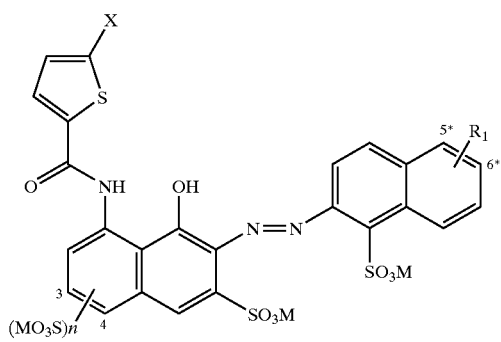

(IV)

wherein
$R_1$ represents hydrogen, $SO_3M$ or $SO_2CH_2CH_2A$, where A represents OH, $OSO_3M$ or $NR_4R_5$;
$R_4$, $R_5$ independently represent hydrogen, substituted unbranched or branched alkyl having from 1 to 8 C atoms, where the substituents are selected from the group consisting of OH, $OCH_3$, COOM and $SO_3M$;

X represents hydrogen, chloro or bromo;
M represents hydrogen, a metal cation or an ammonium cation, which may be substituted by one or more alkyl or substituted alkyl or hydroxyalkoxyalkyl groups each having from 1 to 18 C atoms
and
n is 0 or 1 and of general formula (V)

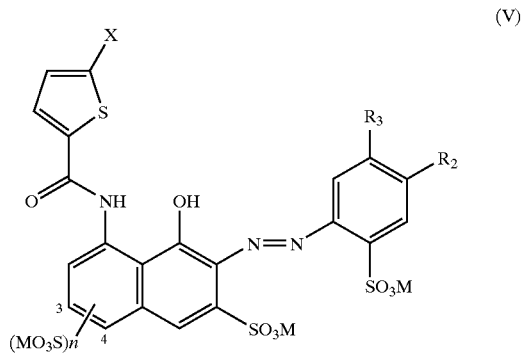

(V)

wherein $R_2$, $R_3$ independently represent hydrogen, alkyl or alkoxy each having from 1 to 6 C atoms, substituted amide having up to 12 C atoms, where the substituents are selected from the group consisting of COOM, OH, $OCH_3$, $NH_2$, chloro, $COOCH_3$ and $COOCH_2CH_3$; $SO_3M$, fluoro, chloro or bromo; or where either $R_2$ or $R_3$ represent a moiety of formula (VI)

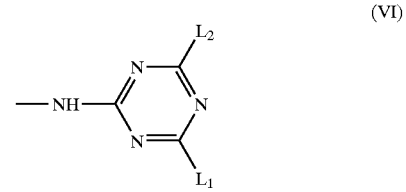

(VI)

wherein $L_1$ and $L_2$ independently represent OH, alkoxy having from 1 to 6 C atoms, substituted thioalkyl having from 1 to 6 C atoms where the substituents are selected from the group consisting of OH, COOM and $SO_3M$; chloro or $NR_6R_7$;
$R_6$, $R_7$ independently represent hydrogen, unbranched or branched alkyl having from 1 to 12 C atoms; substituted alkyl having from 2 to 6 C atoms, where the substituents are selected from the group consisting of OH, $OCH_3$, COOM, $SO_3M$ and $N(CH_3)_2$; aralkyl; aryl or substituted aryl, where the substituents are selected from the group consisting of $OCH_3$, chloro, bromo, COOM and $SO_3M$; or where $R_6$ and $R_7$ together form a ring with our without a hetero atom;

X represents hydrogen, chloro or bromo;
M represents hydrogen, a metal cation or an ammonium cation, which may be substituted by one or more alkyl or substituted alkyl or hydroxyalkoxyalkyl groups each having from 1 to 18 C atoms
and
n is 0 or 1.

Preferred are monoazo dyes of general formula (IV), where X, M and n are as defined above and $R_1$ represents hydrogen or $SO_3M$.

Especially preferred are non-reactive dyes of general formula (VII) having incorporated a moiety of formula (VI), where X, $R_6$, $R_7$ and n are as defined above

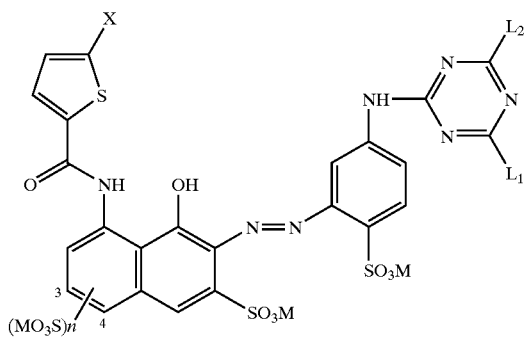

(VII)

and
$L_1$, $L_2$ independently represent OH, alkoxy having from 1 to 6 C atoms, substituted thioalkyl having from 1 to 6 C atoms where the substituents are selected from the group consisting of OH, COOM and $SO_3M$; or $NR_6R_7$.

Dyes of general formula (IV) according to the invention, where $R_1$ represents $SO_2CH_2CH_2OSO_3M$, and dyes of general formula (V), where $L_1$ represents chloro, are reactive dyes. These dyes may be linked chemically to appropriate substrates, in particular to textile materials.

Preferred as metal cations are the cations of the alkali metals (Li, Na, K) and of the alkaline earth metals (Mg, Ca, Ba), as well as the ammonium cation which may be substituted by one or more alkyl groups each having from 1 to 4 C atoms or hydroxy substituted alkyl groups each having from 1 to 6 C atoms. Dyes having incorporated such a substituted ammonium cation show a particularly elevated solubility.

The prepared dyes of general formula (IV) are listed in Table 1 together with the position of their absorption maximum in aqueous solution:

TABLE 1

| Compound No. | n/Position | $R_1$/Position | X | M | $\lambda_{max}$ in $H_2O$ (nm) |
|---|---|---|---|---|---|
| 10 | 1/3 | $SO_3M/5$ | H | Na | 541 |
| 11 | 0 | $SO_3M/5$ | H | Na | 514 |
| 12 | 0 | $SO_3M/6$ | H | Na | 531 |
| 13 | 1/3 | $SO_3M/6$ | H | K | 543 |
| 14 | 0 | H | H | Li | 518 |
| 15 | 1/3 | H | H | Na | 546 |
| 16 | 1/4 | H | H | Na | 515 |
| 17 | 1/4 | $SO_3M/5$ | H | Na | 511 |
| 18 | 1/3 | $SO_3M/5$ | Br | Na | 543 |
| 19 | 1/4 | $SO_3M/5$ | Br | Na | 513 |
| 20 | 0 | $SO_3M/5$ | Br | Na | 516 |
| 21 | 1/4 | $SO_3M/6$ | Br | Na | 535 |
| 22 | 1/4 | H | Br | Na | 516 |

The prepared dyes of general formula (V) are listed in Table 2 together with the position of their absorption maximum in aqueous solution:

TABLE 2

| Compound No. | n/Position | $R_2$ | $R_3$ | X | M | $\lambda_{max}$ in $H_2O$ (nm) |
|---|---|---|---|---|---|---|
| 50 | 1/3 | $CH_3$ | H | H | Na | 547 |
| 51 | 1/3 | $CH_3$ | H | H | K | 547 |
| 52 | 0 | $OCH_3$ | H | H | Na | 531 |
| 53 | 1/3 | H | H | H | Li | 534 |
| 54 | 1/3 | $NHCOCH_3$ | H | H | Na | 536 |
| 55 | 1/3 | H | $NHCOCH_3$ | H | Na | 533 |
| 56 | 1/3 | H | $NHCOCH_2Cl$ | H | Na | 533 |
| 57 | 1/3 | H | $NHCH_2CH_2COOM$ | H | Na | 516 |
| 58 | 1/3 | $OCH_3$ | H | H | K | 537 |
| 59 | 0 | $CH_3$ | H | H | Na | 519 |
| 60 | 0 | H | H | H | Na | 512 |
| 61 | 1/4 | $OCH_3$ | H | H | Na | 520 |

The prepared dyes of general formula (VII) are listed in Table 3 together with the position of their absorption maximum in aqueous solution:

TABLE 3

| Compound No. | n/ | $L_1$ | $L_2$ | X | M | $\lambda_{max}$ in $H_2O$ (nm) |
|---|---|---|---|---|---|---|
| 100 | 1/3 | $S(CH_2)_3SO_3M$ | $OCH_2CH_3$ | H | Na | 535 |
| 101 | 1/3 | Cl | $OCH_2CH_3$ | H | Na | 532 |

The compounds of general formulas (IV) and (V) may be in the free acid form or in the form of inorganic or organic salts thereof. Preferably, they are in the form of their alkali or ammonium salts, wherein the ammonium cation may be substituted. Examples of such substituted ammonium cations are 2-hydroxyethylammonium, bis-(2-hydroxyethyl)-ammonium, tris-(2-hydroxyethyl)-ammonium, bis-(2-hydroxyethyl)-methylammonium, tris-[2-(2-methoxyethoxy)-ethyl]-ammonium, 8-hydroxy-3,6- dioxaoctylammonium and tetraalkylammonium such as tetramethylammonium or tetrabutylammonium.

The invention not only relates to pure monoazo dyes of general formulas (IV) and (V), but also to mixtures of these compounds.

The invention further claims a process for the preparation of the monoazo dyes of formulas (IV) and (V) according to the invention, characterized in that an amine of general formula (VII)

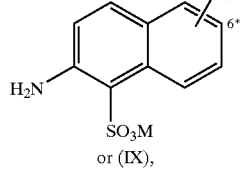
(VIII)

or (IX),

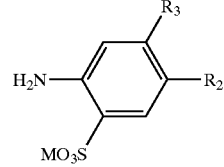
(IX)

wherein $R_1$, $R_2$, $R_3$ and M are as defined above, is diazotized and subsequently coupled with a compound of formula (X),

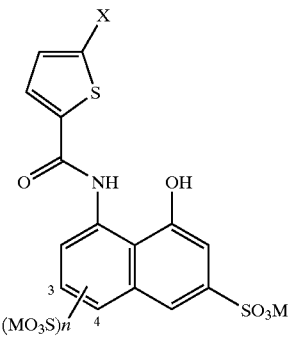
(X)

wherein M, X and n are as defined above, under conditions that the dyes of general formulas (IV) and (V) according to the invention are formed.

The dyes of formulas (IV) and (V) according to the invention are used to dye cellulose containing materials, paper, leather or textile materials such as cotton, wool, polyamides and viscose to provide dyed material with good water fastness and light stability.

It is especially advantageous if the dyes of general formula (IV) according to the invention, where the substituent $R_1$ is the reactive group $SO_2CH_2CH_2OSO_3M$, and, the dyes of general formula (V) according to the invention, where one of the substituents $L_1$ or $L_2$ contains a chlorine atom, are fixed to the textile material by heating to a temperature from 60° C. to 130° C., preferably from 80° C. to 120° C., after dying or printing.

All methods well known in the textile and paper industries for dyeing with substantive dyes may be used with the dyes, preferably for the bulk or surface treatment of sized or unsized paper. The dyes may also be used in the dyeing of yarns and piece goods of cotton, viscose and linen by the exhaustion process from a long liquor or in a continuous process.

The invention furthermore relates to liquid dye preparations comprising at least one dye of general formulas (IV) or (V). The use of such liquid dye preparations is preferred for paper dyeing. Such stable, liquid, preferably aqueous, concentrated dye preparations may be obtained by using methods well known in the art, preferably by dissolving in suitable solvents. The possibility of preparation of such stable aqueous concentrated preparations in the course of dye synthesis itself, without intermediate isolation of the dye, for example after a desalting step by diafiltration of the reaction solution, is of particular advantage.

Dyes or mixtures of dyes of general formulas (IV) and (V) are excellent dyes for the preparation of inks for ink jet printing.

The dyes of general formulas (IV) or (V) may be combined advantageously with other magenta dyes, in particular those described for example in patent applications WO 96/24,636, EP 0,918,074 and EP 1,006,157 and in U.S. Pat. No. 5,074,914 to Shirota et al.

Such an ink comprises one or more of the compounds according to the invention in a liquid aqueous medium. The ink contains from 0.5 to 20% by weight, preferably from 0.5 to 8% by weight, of these compounds, based on the total weight of the ink. The liquid medium is preferably water or a mixture of water and water miscible organic solvents. Suitable solvents are given for example in U.S. Pat. No. 4,626,284 to Ohta et al., U.S. Pat. No. 4,703,113 to Baxter et al. and U.S. Pat. No. 4,963,189 to Hindagolla and in patent applications GB 2,289,473, EP 0,425,150 and EP 0,597,672.

The present invention will be illustrated in more detail by the following examples without limiting the scope of the claimed compounds in any way.

EXAMPLES

Example 1

Compound No. 10 of Table 1 was prepared in the following way:
Dye Coupling Component:
The compound of formula (X),

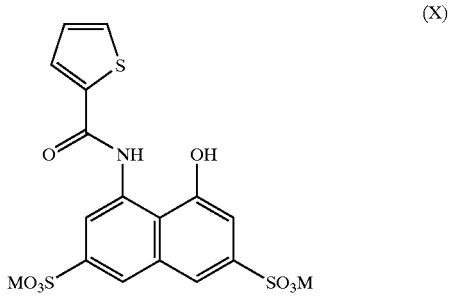
(X)

wherein M represents Na, was prepared in the following way:

160.6 g (0.4 moles) of the monosodium salt of 4-amino-5-hydroxynaphthalene-2,7-disulfonic acid (Content 85%, available from MERCK Schuchardt, Darmstadt, Germany) were suspended in 720 ml of water and the value of pH was adjusted to 5 by the addition of an aqueous solution of sodium hydroxide (30%). 72.5 g (0.48 moles) of the chloride of thiophene-2-carboxylic acid (Content 97%, available from Fluka Chemie GmbH, Buchs, Switzerland) were added drop-wise within 1 hour while maintaining the value pH between 5.0 and 6.0 by simultaneous addition of an aqueous solution of sodium hydroxide (30%). Afterwards stirring was continued for a further 2 hours, the resulting mixture was cooled down to room temperature and the precipitated product was collected by means of suction filtration and dried. 160 g of the product of formula (X) were obtained in this way.

Diazo Suspension A 30.3 g (0.1 moles) of 2-naphthylamine-1,5-disulfonic acid (available from Acros Organics, Geel, Belgium) were suspended in 400 ml of water and the value of pH was adjusted to 8.0 by the addition of an aqueous solution of sodium hydroxide (30%). The resulting solution was cooled down to a temperature between 0° C. and 5° C. and 25 ml of an aqueous solution of sodium nitrite (4N) were added. 25 ml of an aqueous solution of hydrochloric acid (37%) were added within 10 minutes under stirring at a temperature of from 0° C. to 10° C. Afterwards stirring was continued for 1 hour at this temperature. Finally, the excess of nitrous acid was removed by reaction with sulfaminic acid.

Preparation of Dye No. 10

This cold diazo suspension A was added within 30 minutes at an internal temperature of from 5° C. to 10° C. to 47.3 g of the suspension of the coupling component of formula (X) in 300 ml of water while maintaining the value of pH between 8 and 10 by simultaneous addition of an aqueous solution of sodium hydroxide (20%). Stirring was continued for 2 hours at a temperature from 5° C. and 20° C. and for a further 18 hours at room temperature. The dye was salted out by addition of sodium chloride, the precipitate was filtered off and purified by double precipitation from water/ethanol. 52 g of dye No. 10 were obtained in this way.

The monoazo dyes No. 11 to 22, 50 to 61 and 100 to 101 comprising a thiophene moiety according to the invention may be prepared in a similar way by using appropriate starting materials.

Preparation of Ink Examples

The present invention, as far as it relates to inks, is illustrated by the following examples using dyes according to the invention from Tables 1, 2 and 3 and dyes representing the state of the art. 100 g of each ink were prepared by heating the necessary amount of dye (2–5 g), glycerol (5 g), ethylene glycol (5 g), Tergitol 15-S-7 (available from Union Carbide Co., Houston, USA) (0.5 g) and a biocide solution (Mergal K 10N, available from Riedel-de-Haen, Seelze, Germany) (0.2 g) together with water at a temperature of 50° C. under stirring for approximately 1 hour. The resulting solution was cooled down to a temperature of 20° C., its value of pH was adjusted to 7.5 and the solution was passed through a Millipore® filter of 0.5 µm pore diameter. The dye quantity was adjusted in such a way that the optical density of the printed image was similar for all dyes.

Testing of Ink Examples

The inks were then jetted onto the recording sheets ILFORD Photo Paper IJP1GP7 (available from ILFORD Imaging Switzerland GmbH, Fribourg, Switzerland) (Recording Sheet 1) and Xerox 4024 DP (Recording Sheet 2) with an ink jet printer Canon BJC 8500.

Afterwards color coordinates (L*a*b* values) were measured on printed samples using a Gretag SPM 100 spectrometer, available from Gretag AG, Regensdorf, Switzerland.

The L*a*b* values (illuminant $D_{65}$) are listed in pairs in Table 6. In each pair, the dyes according to the invention comprise a thiophene substituent, and the dyes representing the state of the art a phenyl substituent at the same position.

TABLE 6

| Compound No. | L*a*b* values (Recording Sheet 1) | L*a*b* values (Recording Sheet 2) |
| --- | --- | --- |
| 10 | 46.6/81.5/−11.9 | 52.9/65.0/−8.8 |
| I | 47.0/85.1/−10.4 | 53.3/68.7/−7.4 |
| 50 | 47.1/84.0/−14.7 | 53.3/67.5/−10.8 |
| II | 45.6/83.1/−3.5 | 52.9/66.1/−2.7 |
| 100 | 45.4/77.4/−10.1 | 52.1/61.1/−6.6 |
| III | 46.9/84.0/−8.2 | 53.2/67.3/−5.8 |

A comparison of the measured L*a*b* values of printed samples from Table 6, wherein the inks comprise the dyes according to the invention, clearly shows that inks comprising the dyes comprising a thiophene substituent show more negative values of b* than inks comprising the equivalent dyes (I), (II) and (III), representing the state of the art, comprising a phenyl substituent. The brilliant magenta dyes according to the invention having a bluish hue are therefore especially well suited in ink jet printing, because they allow a gamut extension in combination with suitable yellow and cyan dyes.

Finally, variations from the examples given herein are possible in view of the above disclosure. Therefore, although the invention has been described with reference to certain preferred embodiments, it will be appreciated that other dyes may be devised, which are nevertheless within the scope and spirit of the invention as defined in the claims appended hereto.

The foregoing description of various and preferred embodiments of the present invention has been provided for purposes of illustration only, and it is understood that numerous modifications, variations and alterations may be made without departing from the scope and spirit of the invention as set forth in the following claims.

What is claimed is:

1. Monoazo dyes of general formula (IV)

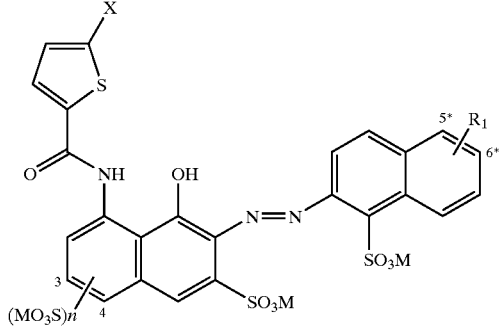

wherein
  $R_1$ represents hydrogen, $SO_3M$ or $SO_2CH_2CH_2A$, where
    A represents OH, $OSO_3M$ or $NR_4R_5$;
  $R_4$, $R_5$ independently represent hydrogen, substituted unbranched or branched alkyl having from 1 to 8 C atoms, where the substituents are selected from the group consisting of OH, $OCH_3$, COOM and $SO_3M$;
  X represents hydrogen, chloro or bromo;
  M represents hydrogen, a metal cation or an ammonium cation, which may be substituted by one or more alkyl or substituted alkyl or hydroxyalkoxyalky groups each having from 1 to 18 C atoms
  and n is 0 or 1.

2. Monoazo dyes according to claim 1, wherein $R_1$ represents hydrogen or $SO_3M$;

$R_4$, $R_5$ independently represent hydrogen, substituted unbranched or branched alkyl having from 1 to 8 C atoms, where the substituents are selected from the group consisting of OH, $OCH_3$, COOM and $SO_3M$;

X represents hydrogen, chloro or bromo;

M represents hydrogen, a metal cation or an ammonium cation, which may be substituted by one or more alkyl or substituted alkyl or hydroxyalkoxyalky groups each having from 1 to 18 C atoms and n is 0 or 1.

3. Monoazo dyes of general formula (V)

$$\text{(V)}$$

wherein $R_2$, $R_3$ independently represent hydrogen, alkyl or alkoxy each having from 1 to 6 C atoms, substituted amide having up to 12 C atoms, where the substituents are selected from the group consisting of COOM, OH, $OCH_3$, $NH_2$, chloro, $COOCH_3$ and $COOCH_2CH_3$; $SO_3M$, fluoro, chloro or bromo; or where either $R_2$ or $R_3$ represent a moiety of formula (VI)

$$\text{(VI)}$$

wherein $L_1$, $L_2$ independently represent OH, alkoxy having from 1 to 6 C atoms, substituted thioalkyl having from 1 to 6 C atoms where the substituents are selected from the group consisting of OH, COOM and $SO_3M$; chloro or $NR_6R_7$;

$R_6$, $R_7$ independently represent hydrogen, substituted alkyl having from 2 to 6 C atoms, where the substituents are selected from the group consisting of OH, $OCH_3$, COOM, $SO_3M$ and $N(CH_3)_2$; aralkyl; aryl or substituted aryl, where the substituents are selected from the group consisting of $OCH_3$, chloro, bromo, COOM and $SO_3M$; or where $R_6$ and $R_7$ together form a ring with our without a hetero atom;

X represents hydrogen, chloro or bromo;

M represents hydrogen, a metal cation or an ammonium cation, which may be substituted by one or more alkyl or substituted alkyl or hydroxyalkoxyalky groups each having from 1 to 18 C atoms and n is 0 or 1.

4. Monoazo dyes according to claim 3, wherein $R_2$ represents hydrogen, $R_3$ represents a moiety of formula (VI)

$$\text{(VI)}$$

wherein $L_1$, $L_2$ independently represent OH, alkoxy having from 1 to 6 C atoms, substituted thioalkyl having from 1 to 6 C atoms where the substituents are selected from the group consisting of OH, COOM and $SO_3M$; chloro or $NR_6R_7$;

$R_6$, $R_7$ independently represent hydrogen, substituted alkyl having from 2 to 6 C atoms, where the substituents are selected from the group consisting of OH, $OCH_3$, COOM, $SO_3M$ and $N(CH_3)_2$; aralkyl; aryl or substituted aryl, where the substituents are selected from the group consisting of $OCH_3$, chloro, bromo, COOM and $SO_3M$; or where $R_6$ and $R_7$ together form a ring with our without a hetero atom;

X represents hydrogen, chloro or bromo;

M represents hydrogen, a metal cation or an ammonium cation, which may be substituted by one or more alkyl or substituted alkyl or hydroxyalkoxyalky groups each having from 1 to 18 C atoms and n is 0 or 1.

5. Process for the preparation of monoazo dyes according to claim 1, wherein an amine of general formula (VIII)

$$\text{(VIII)}$$

wherein $R_1$ represents hydrogen, $SO_3M$ or $SO_2CH_2CH_2A$, where A represents OH, $OSO_3M$ or $NR_4R_5$;

M represents hydrogen, a metal cation or an ammonium cation, which may be substituted by one or more alkyl or substituted alkyl or hydroxyalkoxyalky groups each having from 1 to 18 C atoms is diazotized and subsequently coupled with a compound of formula (X),

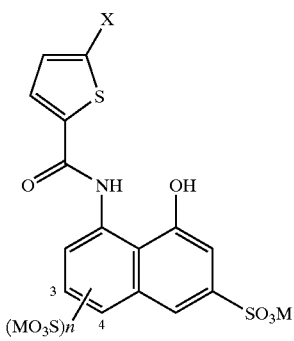

(X)

wherein
X represents hydrogen, chloro or bromo
and
n is 0 or 1
under conditions that the dyes of general formula (IV) are formed.

6. Process for the preparation of monoazo dyes according to claim 3, wherein an amine of general formula (IX)

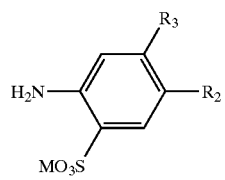

(IX)

wherein
$R_2$, $R_3$ independently represent hydrogen, alkyl or alkoxy each having from 1 to 6 C atoms, substituted amide having up to 12 C atoms, where the substituents are selected from the group consisting of COOM, OH, $OCH_3$, $NH_2$, chloro, $COOCH_3$ and $COOCH_2CH_3$; $SO_3M$, fluoro, chloro or bromo; or where either $R_2$ or $R_3$ represent a moiety of formula (VI)

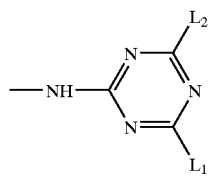

(VI)

wherein
$L_1$, $L_2$ independently represent OH, alkoxy having from 1 to 6 C atoms, substituted thioalkyl having from 1 to 6 C atoms where the substituents are selected from the group consisting of OH, COOM and $SO_3M$; chloro or $NR_6R_7$;
$R_6$, $R_7$ independently represent hydrogen, substituted alkyl having from 2 to 6 C atoms, where the substituents are selected from the group consisting of OH, $OCH_3$, COOM, $SO_3M$ and $N(CH_3)_2$; aralkyl; aryl or substituted aryl, where the substituents are selected from the group consisting of $OCH_3$, chloro, bromo, COOM and $SO_3M$; or where $R_6$ and $R_7$ together form a ring with our without a hetero atom;

M represents hydrogen, a metal cation or an ammonium cation, which may be substituted by one or more alkyl or substituted alkyl or hydroxyalkoxyalky groups each having from 1 to 18 C atoms
is diazotized and subsequently coupled with a compound of formula (X),

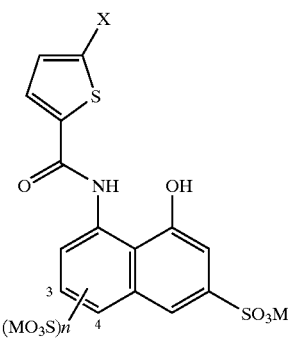

(X)

wherein
X represents hydrogen, chloro or bromo
and
n is 0 or 1
under conditions that the dyes of general formula (V) are formed.

7. Process for dyeing cellulose containing materials, paper, leather and textile materials by applying thereto a monoazo dye or a mixture of monoazo dyes selected from the group consisting of dyes of formulas (IV)

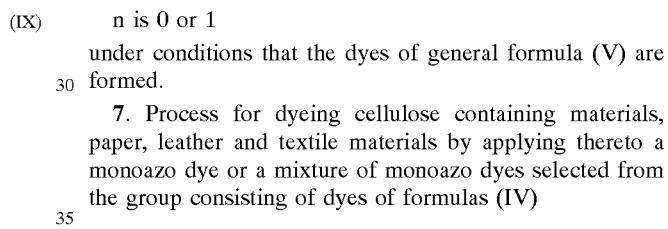

(IV)

wherein
$R_1$ represents hydrogen, $SO_3M$ or $SO_2CH_2CH_2A$, where A represents OH, $OSO_3M$ or $NR_4R_5$;
$R_4$, $R_5$ independently represent hydrogen, substituted unbranched or branched alkyl having from 1 to 8 C atoms, where the substituents are selected from the group consisting OH, $OCH_3$, COOM and $SO_3M$;
X represents hydrogen, chloro or bromo;
M represents hydrogen, a metal cation or an ammonium cation, which may be substituted by one or more alkyl or substituted alkyl or hydroxyalkoxyalkyl groups each having from 1 to 18 C atoms
and
n is 0 or 1 and of formula (V)

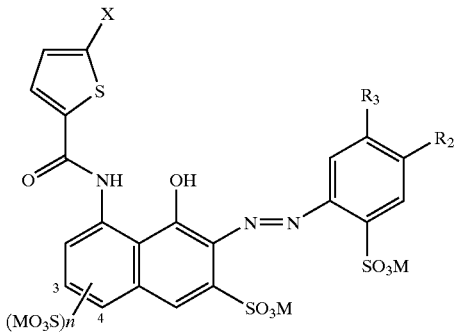

(V)

wherein

R$_2$, R$_3$ independently represent hydrogen, alkyl or alkoxy each having from 1 to 6 C atoms, substituted amide having up to 12 C atoms, where the substituents are selected from the group consisting of COOM, OH, OCH$_3$, NH$_2$, chloro, COOCH$_3$ and COOCH$_2$CH$_3$; SO$_3$M, fluoro, chloro or bromo; or where either R$_2$ or R$_3$ represent a moiety of formula (VI)

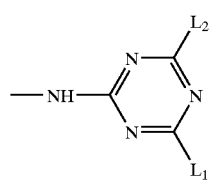

(VI)

wherein

L$_1$, L$_2$ independently represent OH, alkoxy having from 1 to 6 C atoms, substituted thioalkyl having from 1 to 6 C atoms where the substituents are selected from the group consisting of OH, COOM and SO$_3$M; chloro or NR$_6$R$_7$;

R$_6$, R$_7$ independently represent hydrogen, substituted alkyl having from 2 to 6 C atoms, where the substituents COOM, SO$_3$M and N(CH$_3$)$_2$; aralkyl; aryl or substituted aryl, where the substituents are selected from the group consisting a OCH$_3$, chloro, bromo, COOM and SO$_3$M; or where R$_6$ and R$_7$ together form a ring with our without a hetero atom;

X represents hydrogen, chloro or bromo;

M represents hydrogen, a metal cation or an ammonium cation, which may be substituted by one or more alkyl or substituted alkyl or hydroxyalkoxyalkyl groups each having from 1 to 18 C atoms and n is 0 or 1.

8. Process for dyeing textile materials according to claim 7, wherein the textile material is selected from the group consisting of cotton, wool, polyamide and viscose.

9. Liquid dye preparations comprising at least one monoazo dye or a mixture of monoazo dyes selected from the group consisting of dyes of formulas (IV)

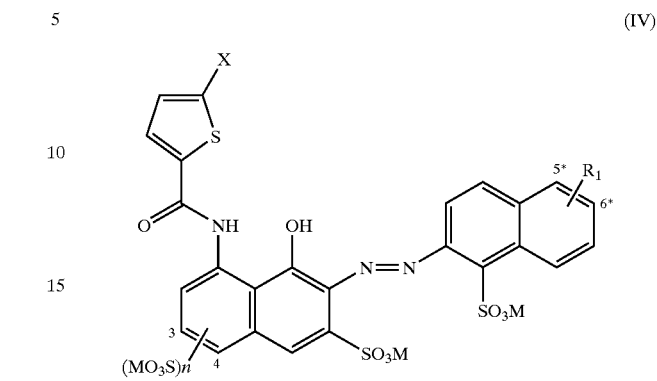

(IV)

wherein

R$_1$ represents hydrogen, SO$_3$M or SO$_2$CH$_2$CH$_2$A, where A represents OH, OSO$_3$M or NR$_4$R$_5$;

R$_4$, R$_5$ independently represent hydrogen, substituted unbranched or branched alkyl having from 1 to 8 C atoms, where the substituents are selected from the group consisting of OH, OCH$_3$, COOM and SO$_3$M;

X represents hydrogen, chloro or bromo;

M represents hydrogen, a metal cation or an ammonium cation, which may be substituted by one or more alkyl or substituted alkyl or hydroxyalkoxyalkyl groups each having from 1 to 18 C atoms and n is 0 or 1 and of formula (V)

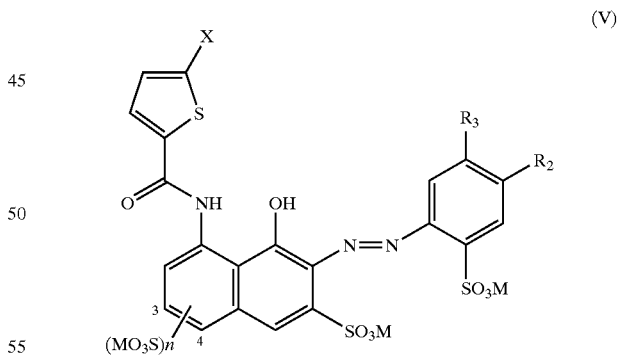

(V)

wherein

R$_2$, R$_3$ independently represent hydrogen, alkyl or alkoxy each having from 1 to 6 C atoms, substituted amide having up to 12 C atoms, where the substituents are selected from the group consisting of COOM, OH, OCH$_3$, NH$_2$, chloro, COOCH$_3$ and COOCH$_2$CH$_3$; SO$_3$M, fluoro, chloro or bromo; or where either R$_2$ or R$_3$ represent a moiety of formula (VI)

and of formula (V)

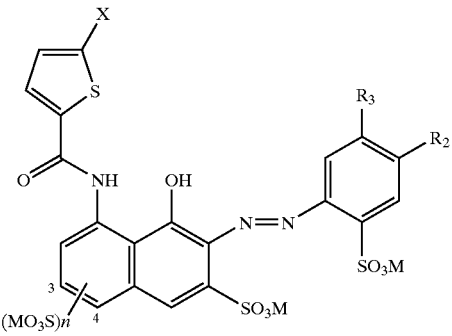

wherein
- $R_2$, $R_3$ independently represent hydrogen, alkyl or alkoxy each having from 1 to 6 C atoms, substituted amide having up to 12 C atoms, where the substituents are selected from the group consisting of COOM, OH, OCH$_3$, NH$_2$, chloro, COOCH$_3$ and COOCH$_2$CH$_3$; SO$_3$M, fluoro, chloro or bromo; or where either $R_2$ or $R_3$ represent a moiety of formula (VI)

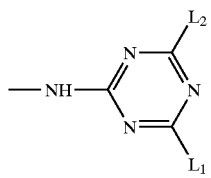

wherein
- $L_1$, $L_2$ independently represent OH, alkoxy having from 1 to 6 C atoms, substituted thioalkyl having from 1 to 6 C atoms where the substituents are selected from the group consisting of OH, COOM and SO$_3$M; chloro or NR$_6$R$_7$;
- $R_6$, $R_7$ independently represent hydrogen, substituted alkyl having from 2 to 6 C atoms, where the substituents are selected from the group consisting of OH, OCH$_3$, COOM, SO$_3$M and N(CH$_3$)$_2$; aralkyl; aryl or substituted aryl, where the substituents are selected from the group consisting of OCH$_3$, chloro, bromo, COOM and SO$_3$M; or where $R_6$ and $R_7$ together form a ring with our without a hetero atom;
- X represents hydrogen, chloro or bromo;
- M represents hydrogen, a metal cation or an ammonium cation, which may be substituted by one or more alkyl or substituted alkyl or hydroxyalkoxyalkyl groups each having from 1 to 18 C atoms and n is 0 or 1.

10. Inks for ink jet printing, comprising at least one monoazo dye or a mixture of monoazo dyes selected from the group consisting of dyes of formulas (IV)

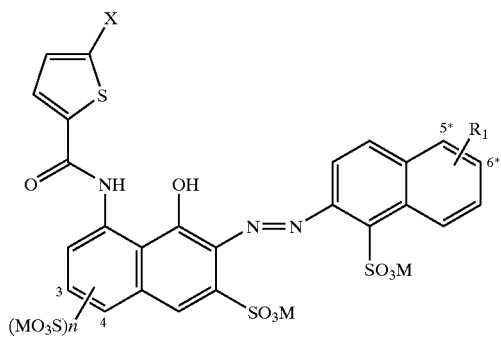

wherein
- $R_1$ represents hydrogen, SO$_3$M or SO$_2$CH$_2$CH$_2$A, where A represents OH, OSO$_3$M or NR$_4$R$_5$;
- $R_4$, $R_5$ independently represent hydrogen, substituted unbranched or branched alkyl having from 1 to 8 C atoms, where the substituents are selected from the group consisting of OH, OCH$_3$, COOM and SO$_3$M;
- X represents hydrogen, chloro or bromo;
- M represents hydrogen, a metal cation or an ammonium cation, which may be substituted by one or more alkyl or substituted alkyl or hydroxyalkoxyalkyl groups each having from 1 to 18 C atoms and n is 0 or 1 and of formula (V)

(V)

wherein
- $R_2$, $R_3$ independently represent hydrogen, alkyl or alkoxy each having from 1 to 6 C atoms, substituted amide having up to 12 C atoms, where the substituents are selected from the group consisting of COOM, OH, OCH$_3$, NH$_2$, chloro, COOCH$_3$ and COOCH$_2$CH$_3$; SO$_3$M, fluoro, chloro or bromo; or where either $R_2$ or $R_3$ represent a moiety of formula (VI)

(VI)

wherein
- $L_1$, $L_2$ independently represent OH, alkoxy having from 1 to 6 C atoms, substituted thioalkyl having from 1 to 6 C atoms where the substituents are selected from the group consisting of OH, COOM and SO$_3$M; chloro or NR$_6$R$_7$;
- $R_6$, $R_7$ independently represent hydrogen, substituted alkyl having from 2 to 6 C atoms, where the substituents are selected from the group consisting of OH, OCH$_3$, COOM, SO$_3$M and N(CH$_3$)$_2$; aralkyl; aryl or substituted aryl, where the substituents are selected from the group consisting of OCH$_3$, chloro, bromo, COOM and SO$_3$M; or where $R_6$ and $R_7$ together form a ring with our without a hetero atom;
- X represents hydrogen, chloro or bromo;
- M represents hydrogen, a metal cation or an ammonium cation, which may be substituted by one or more alkyl or substituted alkyl or hydroxyalkoxyalkyl groups each having from 1 to 18 C atoms and n is 0 or 1.

11. Inks for ink jet printing according to claim 10, comprising in addition to at least one monoazo dye or a mixture of monoazo dyes selected from the group consisting of dyes of formulas (IV) and (V) one or more other dyes.

12. Process for printing of textile materials by applying thereto an ink comprising one or more dyes selected from the group consisting of dyes of formulas (IV)

(IV)

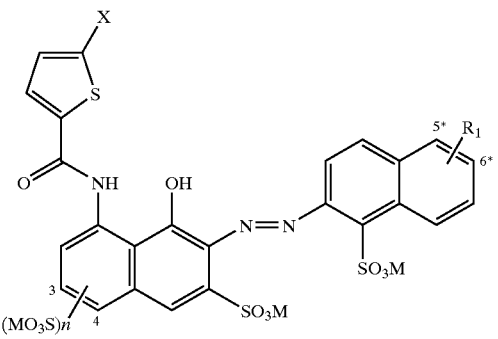

wherein
R$_1$ represents hydrogen, SO$_3$M or SO$_2$CH$_2$CH$_2$A, where A represents OH, OSO$_3$M or NR$_4$R$_5$;
R$_4$,R$_5$ independently represent hydrogen, substituted unbranched or branched alkyl having from 1 to 8 C atoms, where the substituents are selected from the group consisting of OH, OCH$_3$, COOM and SO$_3$M;
X represents hydrogen, chloro or bromo;
M represents hydrogen, a metal cation or an ammonium cation, which may be substituted by one or more alkyl or substituted alkyl or hydroxyalkoxyalkyl groups each having from 1 to 18 C atoms
and
n is 0 or 1
and of formula (V)

(V)

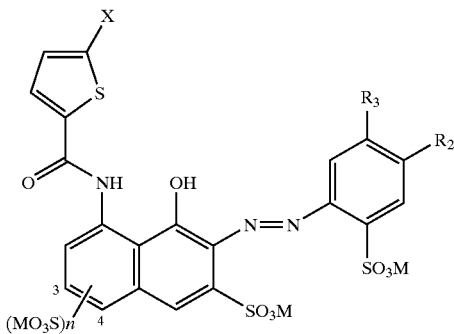

wherein
R$_2$,R$_3$ independently represent hydrogen, alkyl or alkoxy each having from 1 to 6 atoms, substituted amide having up to 12 C atoms, where the substituents are selected from the group consisting of COOM, OH, OCH$_3$, NH$_2$, chloro, COOCH$_3$ and COOH$_2$CH$_3$; SO$_3$M, fluoro, chloro or bromo; or where either R$_2$ or R$_3$ represent a moiety of formula (VI)

(VI)

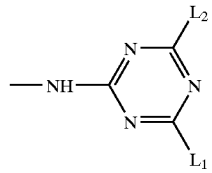

wherein
L$_1$,L$_2$ independently represent OH, alkoxy having from 1 to 6 C atoms, substituted thioalkyl having from 1 to 6 C atoms where the substituents are selected from the group consisting of OH, COOM and SO$_3$M; chloro or NR$_6$R$_7$;
R$_6$,R$_7$ independently represent hydrogen, substituted alkyl having from 2 to 6 C atoms where the substituents are selected from the group consisting of OH, OCH$_3$, COOM, SO$_3$M and N(CH$_3$); aralkyl; aryl or substituted aryl, where the substituents are selected from the group consisting of OCH$_3$, chloro, bromo, COOM and SO$_3$M; or where R$_6$ and R$_7$ together form a ring with our without a hetero atom;
X represents hydrogen, chloro or bromo;
M represents hydrogen, metal cation or an ammonium cation, which may be substituted by one or more alkyl or substituted alkyl or hydroxyalkoxyalkyl groups each having from 1 to 18 C atoms
and
n is 0 or 1,
where in a first step the ink is printed onto the textile material with the aid of an ink jet printer and, in a second step, the dye is fixed to the textile material by heating the printed textile material to a temperature from 60° C. to 130° C.

13. Process according to claim 12, wherein
R$_1$ represents SO$_2$CH$_2$CH$_2$OSO$_3$M
and
L$_1$ or L$_2$ represent chloro.

* * * * *

UNITED STATES PATENT AND TRADEMARK OFFICE
CERTIFICATE OF CORRECTION

PATENT NO. : 6,929,688 B2
DATED : August 16, 2005
INVENTOR(S) : Baettig et al.

It is certified that error appears in the above-identified patent and that said Letters Patent is hereby corrected as shown below:

Column 14,
Line 3, delete "hydroxyalkoxyalky" and insert -- hydroxyalkoxyalkyl --.

Column 15,
Line 50, after the word "substituents" insert -- are selected from the group consisting of OH, $OCH_3$, --.
Line 53, delete "a" and insert -- of --.

Signed and Sealed this

Eighth Day of November, 2005

JON W. DUDAS
*Director of the United States Patent and Trademark Office*